US006434822B1

(12) United States Patent
Perry et al.
(10) Patent No.: US 6,434,822 B1
(45) Date of Patent: Aug. 20, 2002

(54) METHOD OF FUEL INJECTOR ASSEMBLY

(75) Inventors: Robert B. Perry, Leicester; Karl Jacob Haltiner, Jr., Fairport; James Robert Molnar, Penfield, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/660,772

(22) Filed: Sep. 13, 2000

(51) Int. Cl.[7] .......................... B05B 1/30; F16K 31/02

(52) U.S. Cl. .......................... 29/888.41; 29/890.142; 29/434; 29/890.124; 239/584; 219/121.63; 228/124.6; 251/129.18

(58) Field of Search .......................... 29/434, 890.142, 29/888.41, 890.124; 123/472; 239/533.9, 584, 585.1–585.5, 900; 219/121.13, 121.63; 228/124.6; 251/129.18, 129.21

(56) References Cited

U.S. PATENT DOCUMENTS 4,552,312 A * 11/1985 Ohno et al. ................. 239/585
4,588,894 A * 5/1986 Yasuzuka
5,178,362 A * 1/1993 Vogt et al. ............... 239/585.1
5,190,221 A * 3/1993 Reiter ..................... 239/585.1
5,625,946 A * 5/1997 Wildeson et al. ........ 29/888.41
5,875,975 A * 3/1999 Reiter et al. ............ 239/585.1
5,996,910 A * 12/1999 Takeda et al. ........... 239/585.1
6,042,082 A * 3/2000 Graner et al. ............ 239/585.1
6,045,116 A * 4/2000 Willke et al. ............... 239/900

* cited by examiner

*Primary Examiner*—P. W. Echols
*Assistant Examiner*—Eric Compton
(74) *Attorney, Agent, or Firm*—John VanOphem

(57) ABSTRACT

A method of assembly of a fuel injector having a valve plunger reciprocable in a guide tube for movement from a closed position engaging a valve seat to an open position engaging a valve stop by energizing of a solenoid coil to move the plunger against a biasing spring, wherein the method includes setting the valve stop at a position effective to establish the desired valve stroke, and fixing the valve stop to the guide tube by first laser spot welding the valve stop in the guide tube to fix the position of the valve stop without changing the set gap, and then laser seam welding the valve stop in the guide tube at an axial location beyond the spot welds, relative to a plunger-engagable end of the valve stop, to provide a hermetic seal around the valve stop.

6 Claims, 4 Drawing Sheets

METHOD OF FUEL INJECTOR ASSEMBLY

TECHNICAL FIELD

This invention relates to solenoid actuated fuel injectors for engines and the like and, in particular, to a method of assembly that simplifies setting of the injector valve stroke.

BACKGROUND OF THE INVENTION

A solenoid actuated fuel injector for automotive engines is required to operate with a small and precise stroke of its core or valve in order to provide a fuel flow rate within an established tolerance. In some current injectors, the stroke is adjusted at assembly by moving an adjustable valve seat a predetermined dimension from a valve seated position. This adjustment is made after sealing of joints in the fuel conducting elements has been performed, such as by crimping or penetration welding of a solenoid pole piece to a surrounding tubular valve guide. This allows the stroke setting operation to compensate for component movement or shrinkage, which are likely occurrences with crimped or welded joints. However, the requirement for an adjustable valve seat adds cost and complexity to the assembly process.

SUMMARY OF THE INVENTION

The present invention provides a pole piece or core stop that is welded to a guide tube after a stroke setting operation. A continuous penetration seam weld is used in order to provide a hermetic seal of the joint between the parts. The hermetic penetration seam weld does not tend to move the parts axially, or normal to the direction of weld penetration. However, such a seam weld does tend to shrink the outer tubular component, which can cause a shift in the preset valve stroke.

In accordance with the present invention, the stroke is set by adjusting the position of the pole piece or valve stop within an associated guide tube to obtain the desired valve stroke. The guide tube is then fixed to the valve stop in a manner that maintains the preset valve stroke. This is accomplished by first welding the guide tube to the pole piece or valve stop by a series of penetration spot welds. These secure the components together without causing any change in the valve stroke setting, since the non-melted portions of the guide tube between the spot welds prevent dimensional change and absorb the shrinkage stresses. Thereafter, a continuous hermetic seam weld is made between the parts at a point axially spaced from the spot welds in a direction away from the valve seat. The spot welds then maintain the relative dimensions of the components between the spot welds and the valve seat so that any shrinkage in the assembly due to the seam weld occurs in the components away from the valve seat and has no effect upon the preset valve stroke.

These and other features and advantages of the invention will be more fully understood from the following description of certain specific embodiments of the invention taken together with the accompanying drawings.

DESCRIPTION OF THE PREFERRED EMBODIMENT

Figure 1:
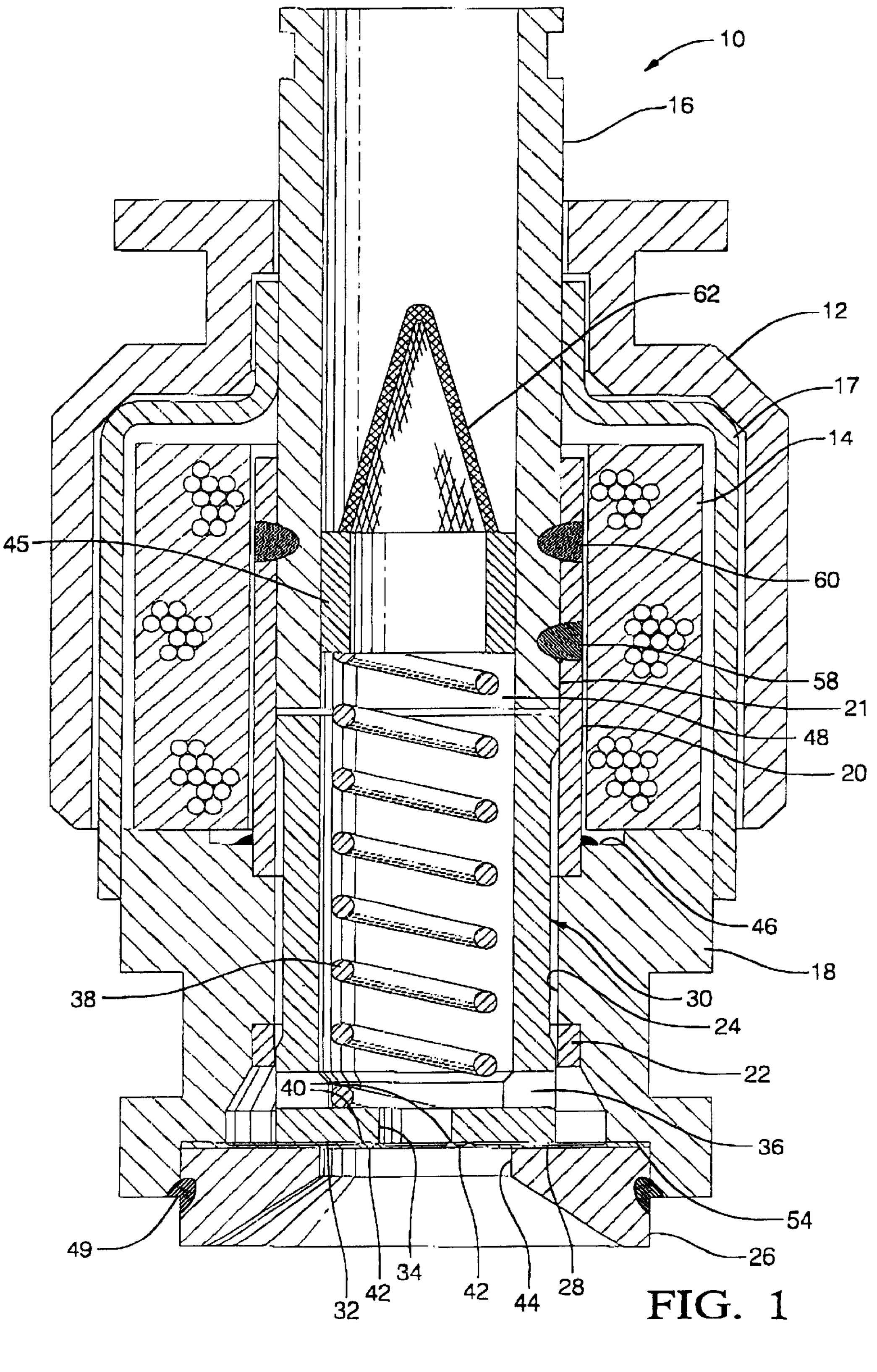
FIG. 1 is a cross-sectional view of a fuel injector including components assembled by a method according to the invention.

Referring first to FIG. 1 of the drawings in detail, numeral 10 generally indicates an exemplary solenoid actuated fuel injector for an engine. Injector 10 includes a non-magnetic cover 12 enclosing a solenoid coil 14. A fuel tube extends through the coil and acts as a tubular magnetic pole 16. An outer strap 17 connects with the inner pole 16, extends around the coil 14 and connects with an annular member forming a valve body 18. A non-magnetic (e.g. stainless steel) guide tube 20 extends upward from the valve body 18 and surrounds the lower end of the magnetic pole 16 to provide an initially telescoping joint 21 that is subsequently sealed by welding as will be subsequently described. A guide ring 22 is spaced below the guide tube 20 in a central bore 24 of the body 18.

A seat support 26 is fixed to a lower end of the valve body 18. The seat support carries a seat member 28 that combines the functions of a valve seat and a director plate. The valve body 18 is fixed, as by welding, to the seat support 26 and engages outer edges of the seat support to position the support and provide a fuel seal. The central bore 24 of the valve body encloses a reciprocable valve plunger 30 that is guided in the bore by the guide tube 20 and the guide ring 22. The plunger is a hollow member with a lower end 32 having a central opening 34 and side openings 36 adjacent the end. A plunger spring 38 biases the plunger downward against annular seat rings 40 that form a valve seat on seat member 28. Spray holes 42 are spaced between the rings 40 and direct a fuel spray out through an open center 44 of the seat support 26 when the valve plunger is lifted off the seat rings 40. A filter supporting calibration ring 45 is pressed into the tubular pole 16 for maintaining a calibrated compression force on the plunger 30 through the spring 38 and for filtering fuel entering the injector.

The plunger 30 is guided by the guide ring 22 and the guide tube 20, which are both fixed in cylindrical counterbores around the central bore 24 of the valve body 18. The counterbore in which the guide tube is fixed lies adjacent a cylindrical inner recess 46 that may receive a ring of brazing material during assembly of the injector.

The guide tube 20 and the tubular pole 16 define a fuel passage 48 for conducting pressurized fuel in the injector. Thus, the cylindrical joint 21 between the guide tube 20 and the pole 16 must be hermetically sealed to prevent fuel leakage as well as structurally strong to maintain the set position of the magnetic pole or valve stop 16. In accordance with the invention, the joint 21 is secured by laser seam welding of the tube 20 to the pole 16 in a manner to be subsequently described. However, it is first necessary to partially assemble the injector components and to set the valve stroke prior to the welding steps in order to obtain the desired advantage of maintaining a preset valve stroke without the need for subsequent adjustment.

Figure 2:
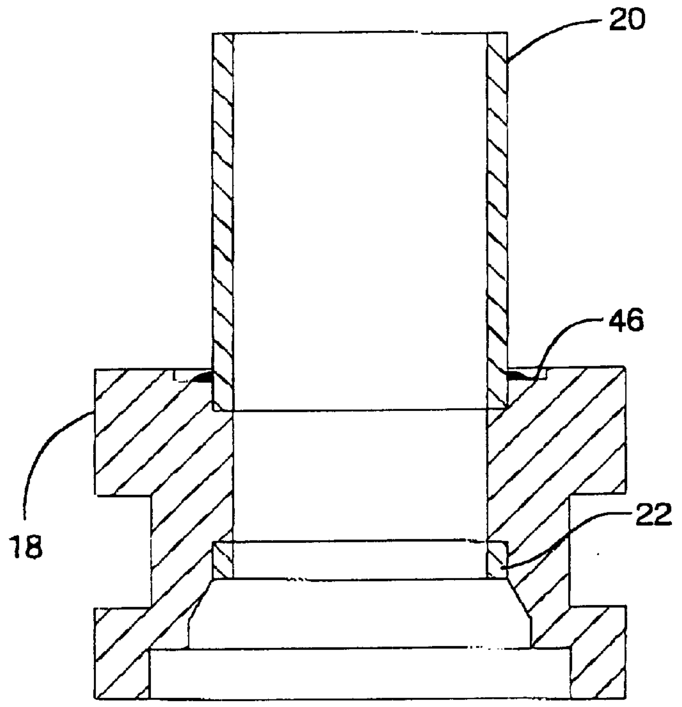
FIG. 2 is a schematic view illustrating brazing of the guide tube into the valve body.
Figure 3:
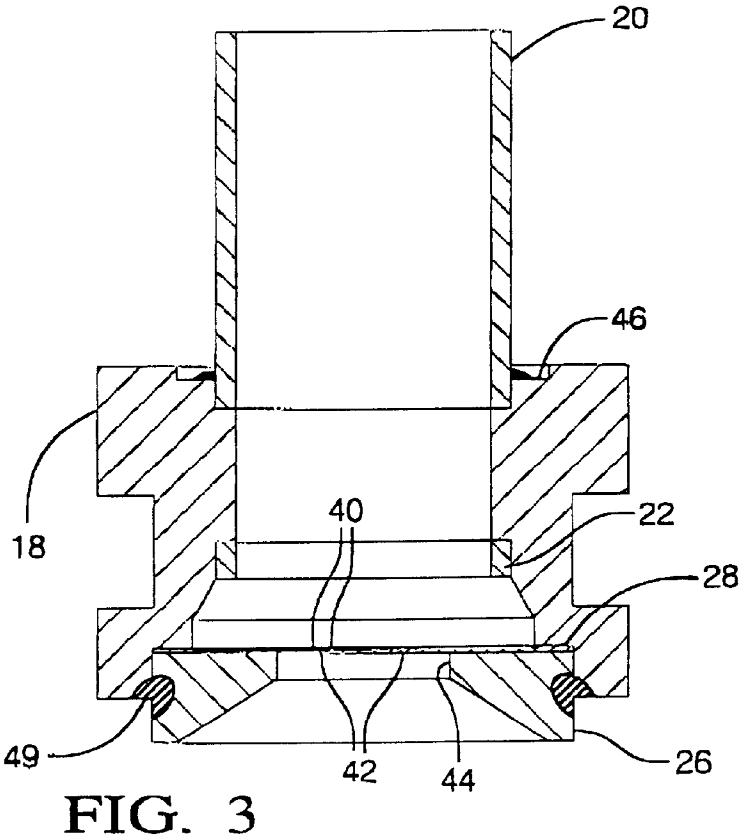
FIG. 3 is a schematic view illustrating welding of the seat support to the valve body.
Figures 4, 5, 5A:
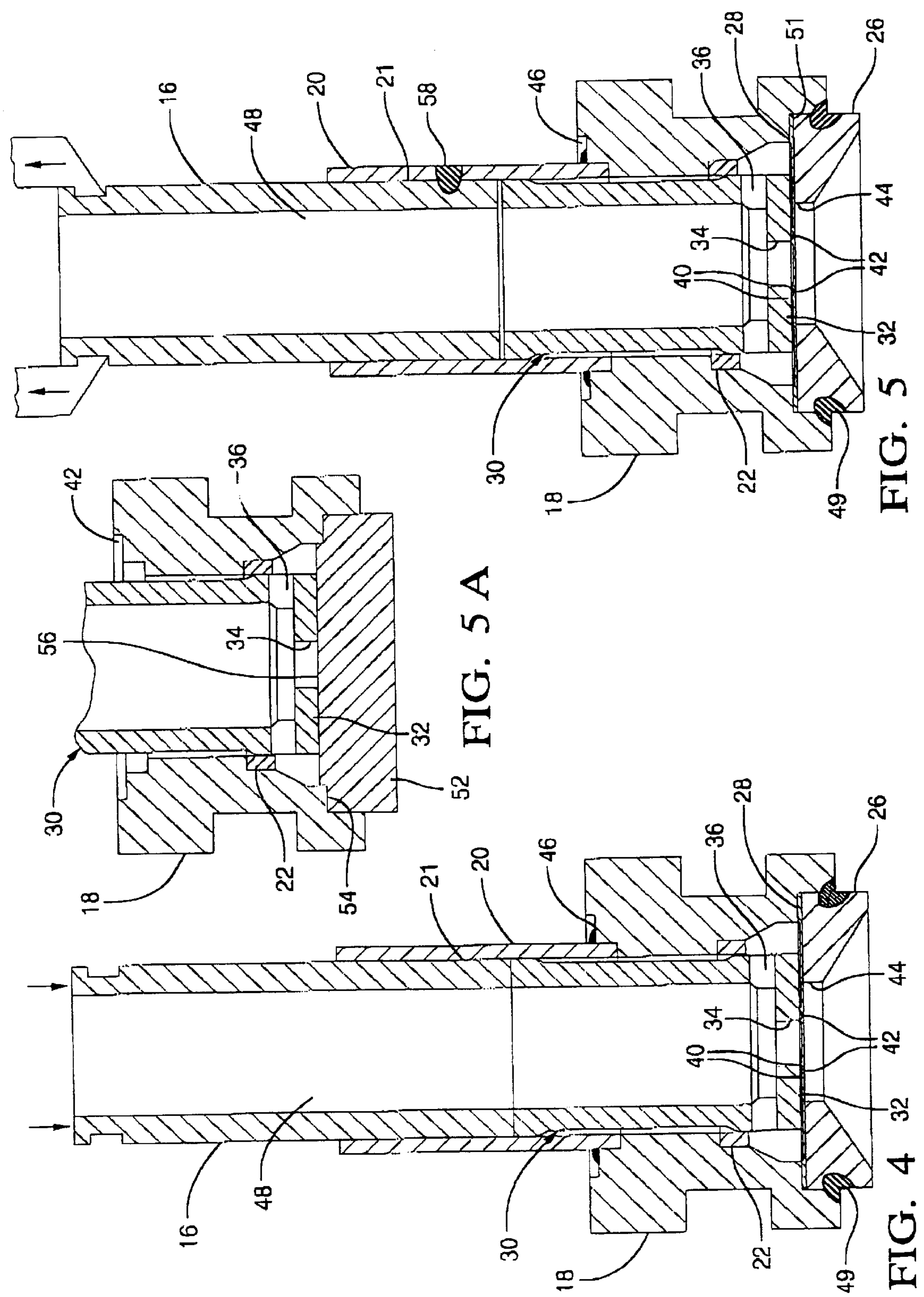
FIG. 4 is a schematic view illustrating setting of the valve plunger and tubular pole at a zero lift position in the guide tube.
FIG. 5 is a schematic view illustrating raising of the pole in the guide tube by the distance of the desired valve stroke.
FIG. 5A is a fragmentary cross-sectional view showing an alternative method of setting the tubular pole for the desired valve stroke.

Alternative methods of assembly and calibration are possible and any suitable manner of setting the valve stroke may be used. In a preferred method, illustrated in FIGS. 2–7, the guide tube 20 is fixed in the valve body 18 by any suitable process, such as welding or furnace brazing the components together at the recess 46 as shown in FIG. 2. The actual valve seat member 28 and seat support 26 for the injector are also fixed in their final positions in the valve body 18 by laser welding the seat support 26 to the valve body 18 as shown at 49 in FIG. 3. As illustrated in FIG. 4, the valve plunger 30 is then installed in the guide tube 20 and the valve stop or magnetic pole 16 is inserted into the guide tube and urged downward, as by a spring loaded fixture, not shown, against the plunger 30, forcing the plunger lower end 32 against the valve seat rings 40. The valve stroke is thus effectively set to zero.

As shown in FIG. 5, by any suitable means, the magnetic pole or valve stop 16 is then forced upward in the guide tube 20 the exact dimension of the desired valve stroke so that the tubular magnetic pole 16 is then set in position to provide the desired valve stroke. The stroke length is very small, on the order of 95 microns, so accuracy in the stroke setting is important. Using the actual injector parts in their installed positions eliminates any effect from parts tolerances, because the stroke is set exactly equal to the upward movement of the pole 16.

Various alternative methods might be used for raising the valve stop (pole 16) to set the valve stroke. With the illustrated embodiment installed in an assembly fixture, the upper end of the tubular pole 16 could be gripped by an adjusting device 50, as shown, to raise the pole 16 a dimension equal to the valve stroke. In other embodiments of injectors which have an opening through the valve seat, an adjusting device may be inserted through the seat opening to engage the lower end of the valve plunger and push both the plunger 30 and the pole 16 upward to the desired position of the pole.

In another alternative for the present embodiment, shown in FIG. 5A, the installation of the valve seat member 28 and seat support 26 may be omitted until after the stroke setting steps. Instead a fixture 52 may be inserted in place of the valve seat and support as shown in FIG. 5A. The fixture 52 would seat against flat seat mounting surface 54 of the body 18 and would include a central protrusion 56 having the height of the desired valve stroke. Then, the plunger 30 would engage the protrusion 56 upon its insertion into the guide tube 20 with the tubular pole 16 engaging the plunger 20 (as shown in FIG. 4). This would locate the pole 16 at the position desired for setting the valve stroke so further movement of the pole would not be required.

At this point, regardless of by what method the desired stroke has been established, the magnetic pole 16 is now in position to be fixed to the guide tube 20. Securing the parts with a laser seam weld would be effective in sealing the cylindrical joint 21 between the pole 16 and tube 20 against the leakage of fuel therethrough from the fuel passage 48. However, such a penetration weld has been found to cause axial shrinkage of the guide tube member, which causes a change in the preset valve stroke. To avoid this, the present invention provides a novel two step welding process that fixes the parts together without changing the stroke while also providing the required hermetic sealing of the joint 21.

Figure 6:
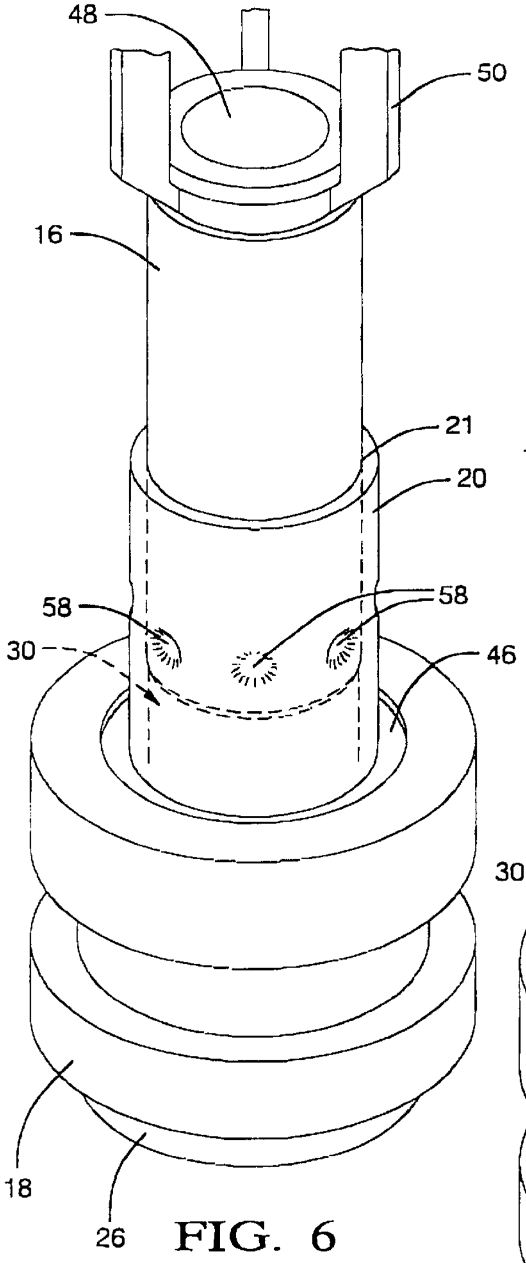
FIG. 6 is a schematic view illustrating laser spot welding of the guide tube to the tubular pole.

As shown in FIGS. 5 and 6, the guide tube 20 is first fixed to the tubular pole 16 by a plurality of circumferentially spaced laser spot welds 58 located toward the lower end of the valve stop formed by the tubular pole 16. This process does not change the preset valve stroke, since the unmelted portions of the guide tube 20 between the spot welds 58 maintain their axial dimensions and hold constant the axial position of the valve stop lower end.

Figure 7:
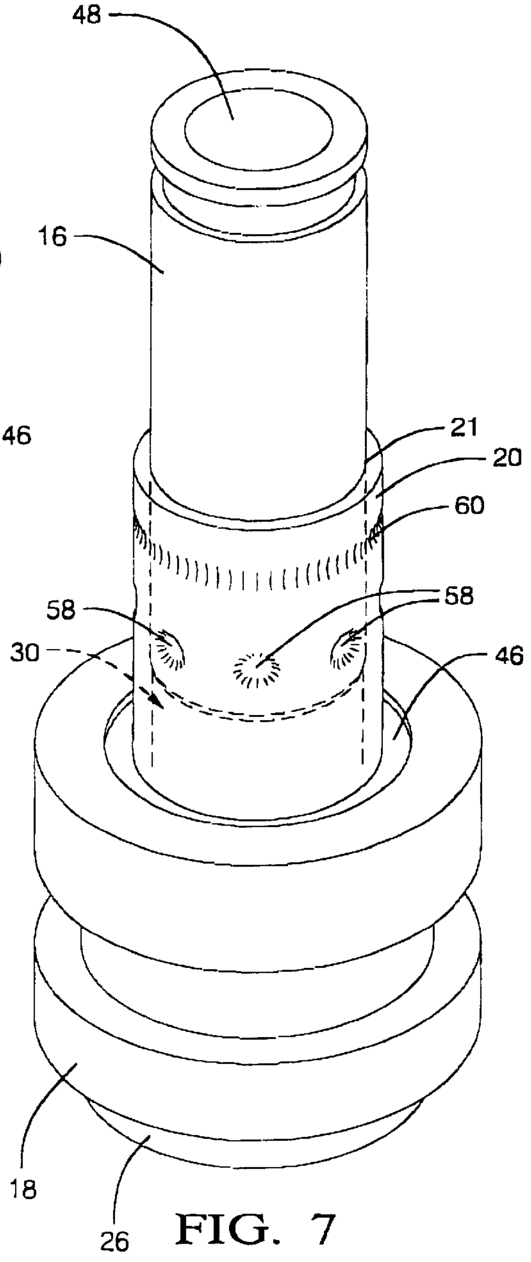
FIG. 7 is a schematic view illustrating laser seam welding of the guide tube to the pole upward of the spot welds.

In the second step, shown in FIG. 7, the guide tube 20 is fixed to the tubular pole 16 by a penetration laser seam weld 60 through the guide tube 20 above the location of the spot welds 58, that is, at an axial location beyond the spot welds relative to the plunger-engagable end of the valve stop (tubular pole 16). The seam weld 60 provides the hermetic seal of the joint 21 between the pole 16 and guide tube 20. Any axial shrinkage of the guide tube due to the seam welding occurs above the seam weld 60, since the lower portion of the guide tube 20 is axially fixed by the prior spot welds 58.

Thereafter, the partially assembled injector, with its established valve stroke, may be completed by assembling the remaining components. This includes installing the coil 14 and the surrounding outer strap 17, which may be welded to the pole 16 and the valve body 18. The plastic cover 12 is also placed in position and a lock ring, not shown, is snapped onto the pole 16, which also serves as the fuel inlet tube for the injector. Within the fuel passage 48, the plunger spring 38 is installed with the calibration ring 45 that is pressed into the pole 16 to maintain a desired spring load and which also carries a fuel inlet filter 62, all as is shown in FIG. 1.

As a result, the initial preset valve stroke is maintained during the subsequent welding of the guide tube 20 to the pole 16, providing a hermetic seal while avoiding any need for subsequent adjustment of the valve stroke in final assembly of the injector.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of assembly of a fuel injector having a valve plunger reciprocable in a guide tube for movement from a closed position engaging a valve seat to an open position engaging a valve stop by energizing of a solenoid coil to move the plunger against a biasing spring, said method comprising:

- installing the plunger in the guide tube in engagement with one of the valve seat and a reference member;
- installing the valve stop in the guide tube and setting a predetermined gap between the valve stop and the normally closed position of the plunger to establish a desired valve stroke;
- laser spot welding the valve stop in the guide tube to maintain the set gap; and
- laser seam welding the valve stop in the guide tube at an axial location beyond the spot welds, relative to a plunger-engagable end of the valve stop, to provide a hermetic seal around the valve stop.

2. A method as in claim 1 wherein the actual valve seat for the injector is fixed to an injector body supporting the guide tube and the valve stroke is set relative to a portion of the valve seat engagable by the plunger.

3. A method as in claim 2 wherein the valve stop is installed in engagement with the plunger as the plunger engages the valve seat and the valve stop is then moved away from the valve seat a dimension equal to the desired valve stroke.

4. A method as in claim 3 wherein the valve stop is moved said dimension by forcing the plunger away from the valve seat while the plunger remains in engagement with the valve stop.

5. A method as in claim 1 wherein a reference member is installed temporarily in place of the valve seat and the valve stroke is set relative to a portion of the reference member engagable by the plunger.

6. A method as in claim 5 wherein the reference member is mounted in place of the valve seat and has a plunger engagable portion protruding beyond the normal position of the valve seat by the dimension of the desired valve stroke, whereby engagement of the plunger with the reference member and the valve stop with the plunger positions the valve stop at the desired position.

* * * * *